US012584336B2

(12) United States Patent
Hu et al.

(10) Patent No.: US 12,584,336 B2
(45) Date of Patent: Mar. 24, 2026

(54) DOOR AND WINDOW SWITCHING MECHANISM WITH STROKE ADJUSTMENT FUNCTION

(71) Applicant: JIANGSU SARCAH GROUP CO., LTD., Taizhou (CN)

(72) Inventors: Tao Hu, Taizhou (CN); Xiang Zhang, Taizhou (CN); Wenming Yang, Taizhou (CN); Liming Fu, Taizhou (CN); Yonggang Zou, Taizhou (CN); Xinzheng Deng, Taizhou (CN)

(73) Assignee: JIANGSU SARCAH GROUP CO., LTD., Taizhou (CN)

( * ) Notice: Subject to any disclaimer, the term of this patent is extended or adjusted under 35 U.S.C. 154(b) by 0 days.

(21) Appl. No.: 18/856,138

(22) PCT Filed: Sep. 12, 2023

(86) PCT No.: PCT/CN2023/118210
§ 371 (c)(1),
(2) Date: Oct. 11, 2024

(87) PCT Pub. No.: WO2024/055955
PCT Pub. Date: Mar. 21, 2024

(65) Prior Publication Data

US 2025/0250836 A1 Aug. 7, 2025

(30) Foreign Application Priority Data

Sep. 15, 2022 (CN) ......................... 202211121856.5

(51) Int. Cl.
*E05D 3/02* (2006.01)
*E05D 15/58* (2006.01)
(Continued)

(52) U.S. Cl.
CPC ............. *E05D 3/022* (2013.01); *E05D 15/58* (2013.01); *A47L 15/4261* (2013.01);
(Continued)

(58) Field of Classification Search
CPC ........... E05Y 2201/62; E05Y 2201/652; E05Y 2201/722; A47L 15/4261; A47L 15/4265
See application file for complete search history.

(56) References Cited

U.S. PATENT DOCUMENTS 368,921 A * 8/1887 Jackson .................. E05D 3/022 49/246
2,078,815 A * 4/1937 Segar ...................... E05D 3/022 16/354
(Continued)

FOREIGN PATENT DOCUMENTS

CN 113491491 A * 10/2021

*Primary Examiner* — Jeffrey O'Brien
(74) *Attorney, Agent, or Firm* — Ming Jiang; OPENPTO US LLC

(57) ABSTRACT

The present invention discloses a door and window switching mechanism with a stroke adjustment function, including a mounting panel, a stroke adjustment mechanism, and a transmission arm plate. The stroke adjustment mechanism includes a stroke bracket, a linear transmission component, a stroke adjustment assembly, and a mounting base. The stroke adjustment assembly consists of a transmission gear, a synchronous pulley, a driven pulley, a synchronous belt, and a sliding base. This invention is reasonable and structurally novel, featuring the ability to convert the rotational movement of the door or window into sliding movement. This allows the door or window to perform reciprocating movement along the installation surface during the opening and closing process, providing functions that prevent collision interference, reduce wear, prevent dust accumulation, and enhance aesthetics. It can be applied to vehicle doors
(Continued)

and windows, conventional doors and windows, as well as products or electrical devices.

10 Claims, 12 Drawing Sheets

(51) Int. Cl.
*A47L 15/42* (2006.01)
*E05F 1/12* (2006.01)
*E05F 3/02* (2006.01)

(52) U.S. Cl.
CPC ......... *A47L 15/4265* (2013.01); *E05F 1/1276* (2013.01); *E05Y 2201/604* (2013.01); *E05Y 2201/62* (2013.01); *E05Y 2201/652* (2013.01); *E05Y 2201/722* (2013.01)

(56) References Cited

U.S. PATENT DOCUMENTS

| | | | | | |
|---|---|---|---|---|---|
| 3,394,428 | A * | 7/1968 | Peterson | E05D 7/081 16/354 |
| 4,979,265 | A * | 12/1990 | Grass | E05D 3/183 16/75 |
| 5,040,857 | A * | 8/1991 | Mandel | F25D 23/028 312/405 |
| 5,500,985 | A * | 3/1996 | Klueger | E05D 3/022 16/361 |
| 6,161,336 | A * | 12/2000 | Ziv-Av | E05D 15/58 49/260 |
| 8,226,183 | B2 * | 7/2012 | Kang | E05D 3/18 49/246 |
| 9,364,132 | B2 * | 6/2016 | Gherardi | E05F 1/1261 |
| 10,081,974 | B2 * | 9/2018 | Gherardi | A47L 15/4261 |
| 10,244,920 | B2 * | 4/2019 | Vanini | E05D 3/14 |

* cited by examiner

DOOR AND WINDOW SWITCHING MECHANISM WITH STROKE ADJUSTMENT FUNCTION

TECHNICAL FIELD

The present invention relates to the technical field of door and window switching devices, specifically to a door and window switching mechanism with a stroke adjustment function.

BACKGROUND

Door and window switches are mechanical devices with relative rotation, commonly used in various doors, windows, and cabinets, including but not limited to vehicle doors and windows, conventional doors and windows, appliances or electrical devices with doors or windows, and they are widely used in daily life.

Common door and window switches, such as hinges and pivots, usually only provide simple connection and rotation functions. However, they have certain defects during use, commonly including: 1. During the opening and closing of doors and windows, collisions or interference easily occur between the doors/windows and the installation body (such as door frames, window frames, etc.), which can also cause wear on the door/window frames (for brittle materials like glass, it may even lead to breakage); 2. When the door or window is closed, the gaps at the connection points are exposed, easily accumulating dust, and aesthetically displeasing.

SUMMARY

To address the above issues, the present invention discloses a door and window switching mechanism with a stroke adjustment function.

The specific technical solution is as follows:

A door and window switching mechanism with a stroke adjustment function comprises a mounting panel, a stroke adjustment mechanism, and a transmission arm plate disposed between the mounting panel and the stroke adjustment mechanism. The mounting panel and stroke adjustment mechanism are rotationally connected. One end of the transmission arm plate is slidably connected to the mounting panel, and the other end is rotationally connected to the stroke adjustment mechanism. The stroke adjustment mechanism includes a stroke bracket, a linear transmission component, a stroke adjustment assembly, and a mounting base. The linear transmission component is slidably mounted on the stroke bracket, and the mounting base is installed on the stroke adjustment assembly. Both ends of the linear transmission component are engaged with the transmission arm plate and the stroke adjustment assembly. When the mounting panel and stroke adjustment mechanism rotate relative to each other, the linear transmission component converts the rotational movement of the transmission arm plate into sliding movement and transmits it to the stroke adjustment assembly. After amplification by the stroke adjustment assembly, it drives the mounting base to move along the extension direction of the stroke bracket.

In the above door and window switching mechanism with a stroke adjustment function, the end of the transmission arm plate that is rotationally connected to the stroke adjustment mechanism is provided with a gear plate. The end of the linear transmission component engaged with the transmission arm plate is provided with a first rack, which meshes with the gear plate. The relative rotation of the transmission arm plate and the linear transmission component drives the linear transmission component to perform reciprocating movement on the stroke bracket.

In the above door and window switching mechanism with a stroke adjustment function, the end of the linear transmission component engaged with the stroke adjustment assembly is provided with a second rack. The stroke adjustment assembly includes a transmission gear, a synchronous pulley, a driven pulley, a synchronous belt, and a sliding base. The synchronous pulley and the driven pulley are respectively arranged on both sides of the stroke bracket and are rotationally mounted through a rotating shaft. The synchronous belt is wrapped around the synchronous pulley and the driven pulley and meshes with them to achieve synchronous rotation of the synchronous pulley and the driven pulley. The sliding base is fixedly connected with the synchronous belt, and the mounting base is fixedly connected with the sliding base.

The transmission gear is coaxially arranged with the synchronous pulley and rotates synchronously. The transmission gear meshes with the second rack. When the linear transmission component performs reciprocating movement on the stroke bracket, the synchronous belt moves synchronously, driving the mounting base fixedly connected with the sliding base to move reciprocatingly on the stroke bracket.

In the above door and window switching mechanism with a stroke adjustment function, the sliding base is slidably matched with the stroke bracket. The lower end of the side farthest from the mounting base is provided with a notch for the sliding of the linear transmission component. The thickness of the linear transmission component is less than that of the first and second racks at both ends, i.e., the upper end surface of the linear transmission component is lower than the upper end surfaces of the first and second racks at both ends. The notch and the linear transmission component are matched with a gap, and the first and second racks at both ends are restricted from entering the notch.

The end of the stroke bracket near the first rack is provided with a vertical plate protruding inward from the bottom of the stroke bracket, which is close to the side of the first rack.

In the above door and window switching mechanism with a stroke adjustment function, one side of the sliding base is provided with a card slot, which is connected to the synchronous belt by card engagement, achieving a fixed connection between the sliding base and the synchronous belt.

In the above door and window switching mechanism with a stroke adjustment function, a long hole is provided on the side of the stroke bracket near the mounting base. A connecting rod is fixedly connected to the side of the sliding base and extends out from the long hole. The mounting base is connected to the sliding base through the connecting rod and moves along with the sliding base.

In the above door and window switching mechanism with a stroke adjustment function, the mounting panel and the stroke adjustment mechanism are rotationally connected through a shaft frame. The stroke bracket is provided with a shaft frame card slot and a detachable shaft frame connecting piece. The shaft frame is mounted at the position of the shaft frame card slot through the shaft frame connecting piece.

In the above door and window switching mechanism with a stroke adjustment function, the stroke bracket is provided with a limiting slot, and the transmission arm plate is L-shaped. A limiting protrusion is provided on the end of the transmission arm plate close to the gear plate, which corresponds with the limiting slot. The mounting panel is provided with a limiting base protruding from the end surface of the mounting panel. The lower end surface of the L-shaped transmission arm plate corresponds with the limiting base. The rotationally connected mounting panel and stroke adjustment mechanism are limited by the corresponding limiting slot and protrusion, limiting base, and limiting surface to control the opening and closing angle of the mounting panel and stroke adjustment mechanism.

In the above door and window switching mechanism with a stroke adjustment function, the mounting panel is provided with a sliding slot and a spring buffer component. The sliding slot is provided with a sliding block that is slidably matched, and the sliding block is rotationally connected with the transmission arm plate, achieving a sliding connection between the transmission arm plate and the mounting panel. One end of the spring buffer component is connected with a pull rod, which is card-connected with the transmission arm plate.

In the above door and window switching mechanism with a stroke adjustment function, the sliding base has a lightweight hollow structure arranged in a grid pattern.

The beneficial effects of the invention are as follows: the door and window switching mechanism with a stroke adjustment function disclosed in the present invention includes a mounting panel, a stroke adjustment mechanism, and a transmission arm plate. The stroke adjustment mechanism includes a stroke bracket, a linear transmission component, a stroke adjustment assembly, and a mounting base. The stroke adjustment assembly includes a transmission gear, a synchronous pulley, a driven pulley, a synchronous belt, and a sliding base. The design of the present invention is reasonable and novel, with the structural characteristic of converting the rotational movement of the door or window into sliding movement, allowing the door or window to reciprocate along the installation surface during opening and closing. This mechanism prevents collision interference, wear, dust accumulation, and enhances aesthetics, making it applicable to conventional doors and windows, vehicle doors and windows, and appliances or electrical devices with doors or windows.

Figure 1:
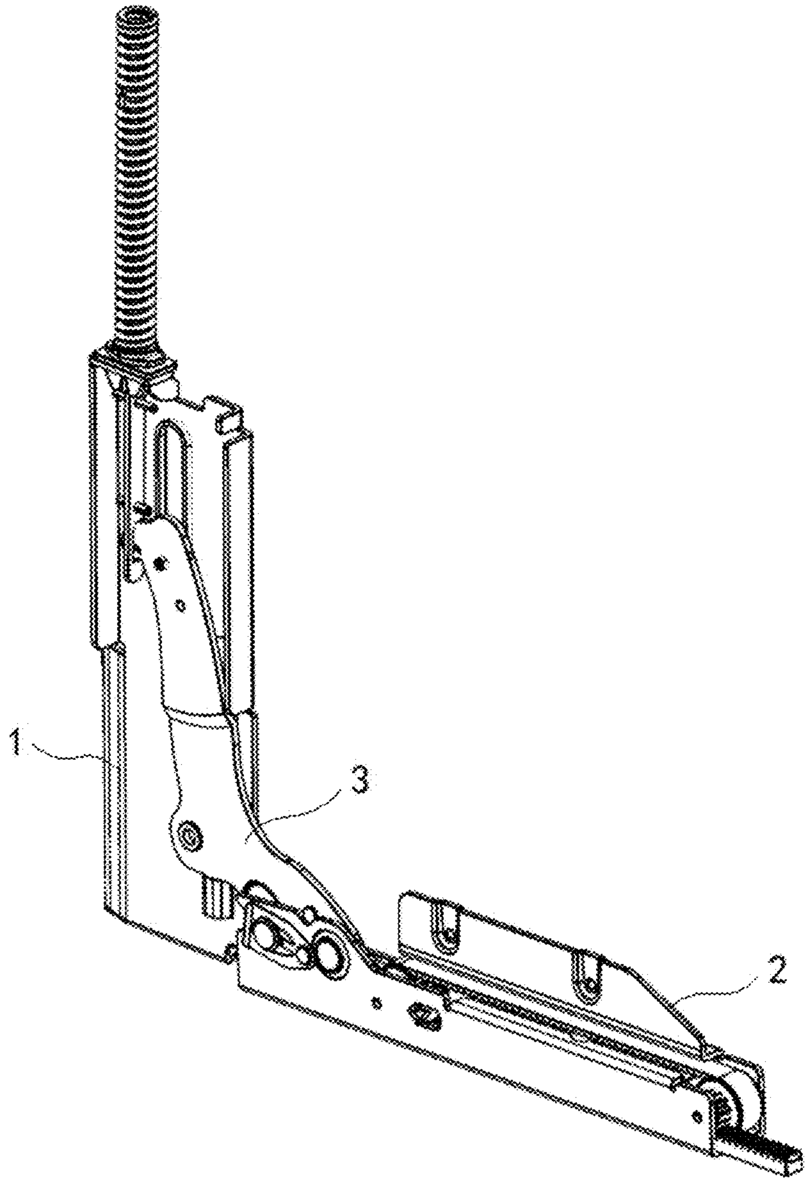
FIG. 1 is a schematic diagram of the open state of the invention.

Reference Numerals: 1, mounting panel; 2, stroke adjustment mechanism; 3, transmission arm plate; 4, stroke bracket; 5, linear transmission component; 6, stroke adjustment assembly; 7, mounting base; 8, gear plate; 9, first rack; 10, second rack; 11, transmission gear; 12, synchronous pulley; 13, driven pulley; 14, synchronous belt; 15, sliding base; 16, notch; 17, pull rod; 18, vertical plate; 19, card slot; 20, long hole; 21, connecting rod; 22, shaft frame; 23, shaft frame card slot; 24, shaft frame connecting piece; 25, limiting slot; 26, limiting protrusion; 27, limiting base; 28, limiting surface; 29, sliding slot; 30, spring buffer component; 31, sliding block.

DETAILED DESCRIPTION

To make the technical solution of the present invention clearer, the following examples further describe the invention. Any equivalent replacements or conventional reasoning made to the technical features of the invention fall within the protection scope of the present invention.

Example 1

Figure 2:
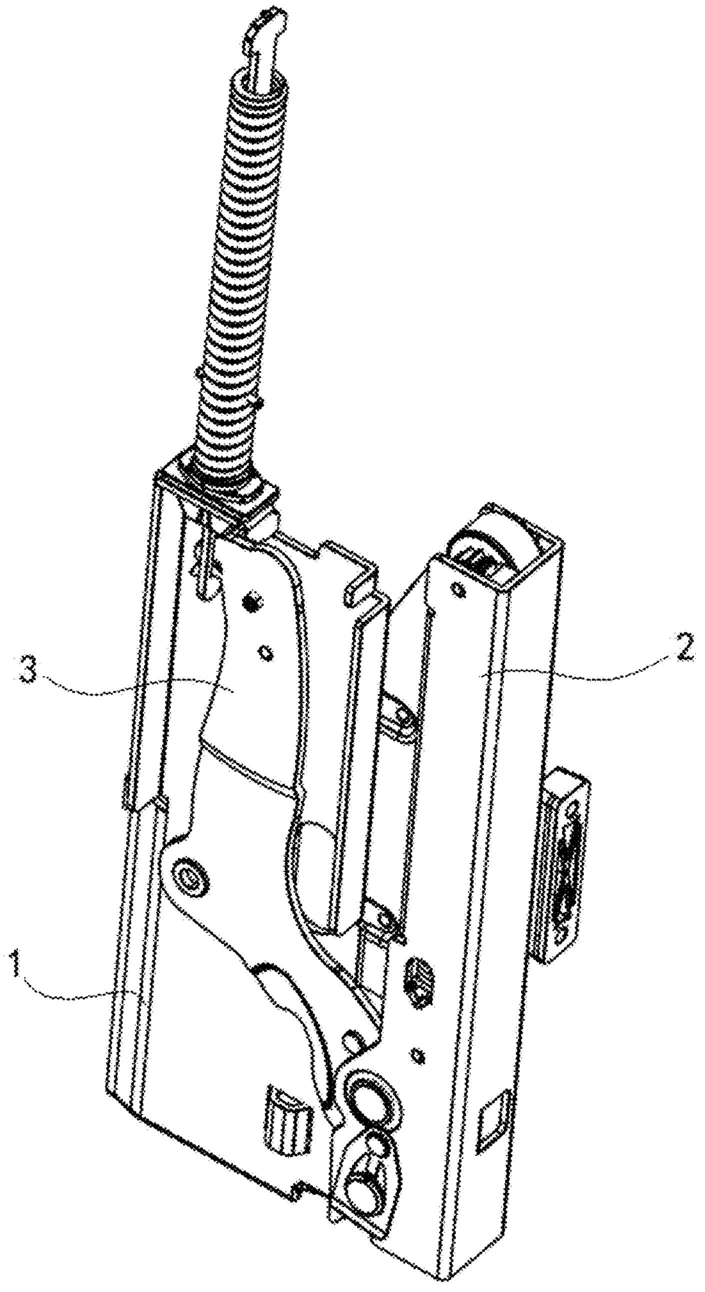
FIG. 2 is a schematic diagram of the closed state of the invention.
Figure 3:
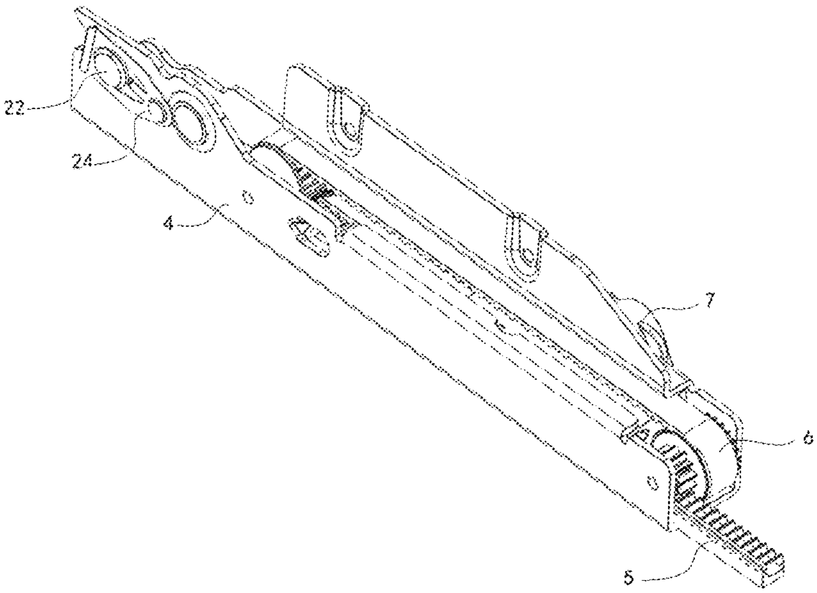
FIG. 3 is a schematic diagram of the stroke adjustment mechanism.

As shown in FIGS. 1-3, a door and window switching mechanism with a stroke adjustment function of this embodiment includes a mounting panel 1, a stroke adjustment mechanism 2, and a transmission arm plate 3 disposed between the mounting panel 1 and the stroke adjustment mechanism 2. The mounting panel 1 and the stroke adjustment mechanism 2 are rotationally connected. One end of the transmission arm plate 3 is slidably connected to the mounting panel 1, and the other end is rotationally connected to the stroke adjustment mechanism 2. In this embodiment, the stroke adjustment mechanism 2 is in a relative rotational state with the transmission arm plate 3 during the opening and closing of the door or window and can convert the rotational movement into sliding movement of the door or window, allowing the door or window to reciprocate along the installation surface. The stroke adjustment mechanism 2 includes a stroke bracket 4, a linear transmission component 5, a stroke adjustment assembly 6, and a mounting base 7.

The stroke bracket 4 serves as a supporting bracket for the linear transmission component 5, stroke adjustment assembly 6, and mounting base 7. The linear transmission component 5 is slidably arranged on the stroke bracket 4, and the mounting base 7 is installed on the stroke adjustment assembly 6. Both ends of the linear transmission component 5 are engaged with the transmission arm plate 3 and stroke adjustment assembly 6. When the stroke adjustment mechanism 2 and the transmission arm plate 3 rotate relative to each other, the rotational movement of the transmission arm plate 3 is transmitted to the stroke adjustment assembly 6 at the rear end, converting into sliding movement (linear movement). The stroke adjustment assembly 6 amplifies the sliding movement and drives the mounting base 7 to move along the extension direction of the stroke bracket 4, causing the door or window installed on the mounting base 7 to move along with it. This mechanism can be applied to conventional doors and windows, vehicle doors and windows, appliances or electrical devices with doors or windows (such as cabinets, sterilizers, dishwashers, etc.).

Example 2

Figure 4:
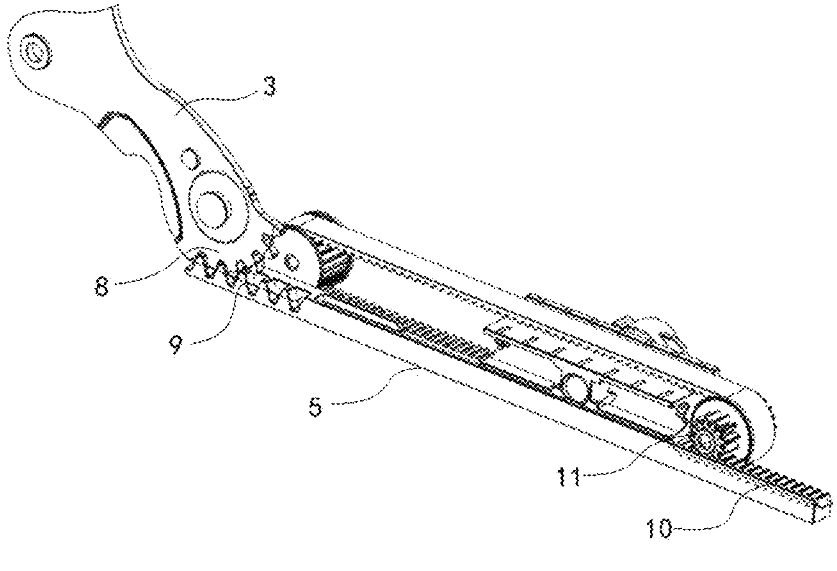
FIG. 4 is a schematic diagram of the cooperation state between the stroke adjustment mechanism and the transmission arm plate (the stroke bracket is not shown).
Figure 5:
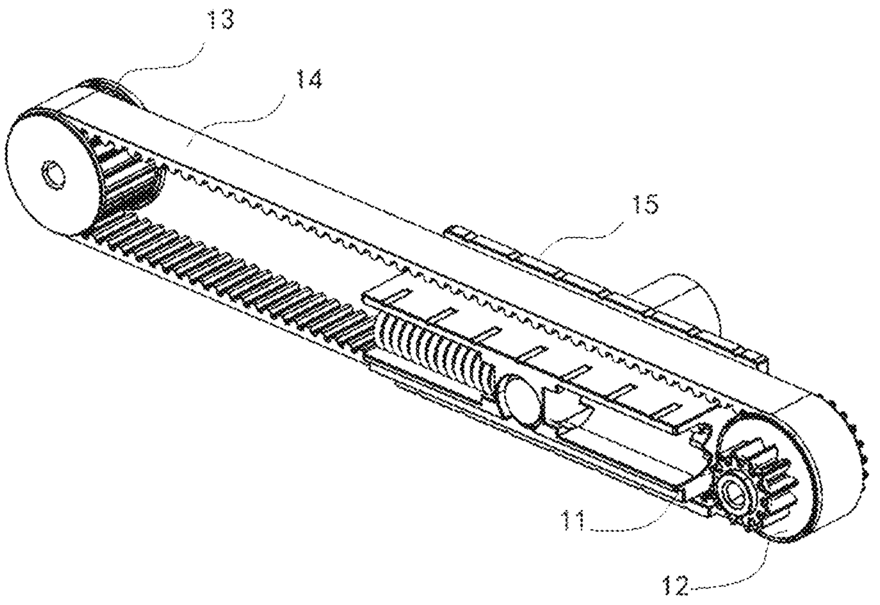
FIG. 5 is a schematic diagram of the stroke adjustment assembly (1).
Figure 6:
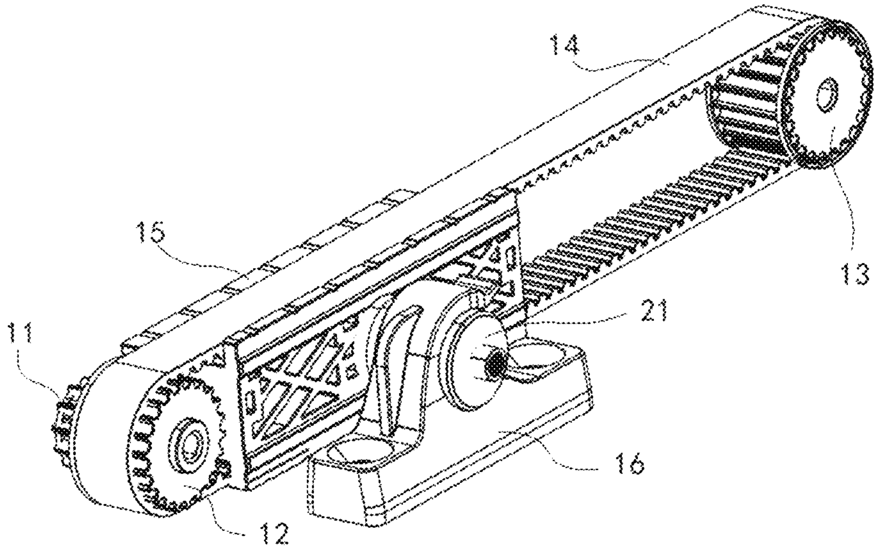
FIG. 6 is a schematic diagram of the stroke adjustment assembly (2).

As shown in FIGS. 4-6, this embodiment discloses a design scheme for converting and amplifying rotational movement. A gear plate 8 is provided at one end of the transmission arm plate 3 that is rotationally connected to the stroke adjustment mechanism 2. A first rack 9 is provided at the end of the linear transmission component 5 engaged with the transmission arm plate 3. The first rack 9 meshes with the gear plate 8. When the stroke adjustment mechanism 2 and the transmission arm plate 3 rotate relative to each other, the rotational movement of the gear plate 8 is transmitted to the linear transmission component 5 through the meshing first rack 9, driving the linear transmission component 5 to perform reciprocating movement on the stroke bracket 4.

The linear transmission component 5, which performs reciprocating movement, is engaged with the stroke adjustment assembly 6 at one end, where a second rack 10 is provided, transmitting the sliding movement to the stroke adjustment assembly 6. The stroke adjustment assembly 6 includes a transmission gear 11, a synchronous pulley 12, a driven pulley 13, a synchronous belt 14, and a sliding base 15. The transmission gear 11 meshes with the second rack 10, converting the sliding movement into its rotational movement and transmitting it to the rear end.

Meanwhile, the synchronous pulley 12 and the driven pulley 13 are respectively arranged on both sides of the stroke bracket 4 and are rotationally mounted through a rotating shaft. The transmission gear 11 is coaxially arranged with the synchronous pulley 12 and rotates synchronously. The synchronous belt 14 is wrapped around the synchronous pulley 12 and the driven pulley 13 and meshes with them. At this time, the synchronous rotation of the transmission gear 11, synchronous pulley 12, and driven pulley 13 occurs. The synchronous pulley 12 converts the rotational movement transmitted by the transmission gear 11 into the movement of the synchronous belt 14 and amplifies it (in this state, the diameter of the transmission gear 11 is smaller than that of the synchronous pulley 12, so the linear speed at the pitch circle of the transmission gear 11 is smaller than that of the synchronous pulley 12, thereby achieving the effect of amplifying the rotational movement and further amplifying the movement of the synchronous belt 14). The sliding base 15 is fixedly connected with the synchronous belt 14 and moves along with it, ultimately driving the mounting base 7, which is fixedly connected with the sliding base 15, to move and perform reciprocating movement.

Based on this embodiment, when the diameter of the transmission gear 11 is equal to that of the synchronous pulley 12, the movement of the mounting base 7 is the same as the rotational movement of the gear plate 8. When the diameter of the transmission gear 11 is greater than that of the synchronous pulley 12, the movement of the mounting base 7 is reduced compared to the rotational movement of the gear plate 8. However, overall, during the opening and closing of the door or window, it still performs reciprocating movement along the installation surface, the difference being in the magnitude of the movement. Compared to conventional door and window opening mechanisms (such as hinges, etc.), this embodiment's door and window switching mechanism always has the feature of controlling the expansion and contraction of the door or window.

Based on the above scheme, the door or window installed with this embodiment's door and window switching mechanism has the feature of extending outward during the opening process (as shown in the state of FIG. 1, the door or window panel extends outward in the right direction of the figure). Conversely, it also has the feature of retracting inward during the closing process (as shown in the state of FIG. 2, the door or window panel retracts inward in the downward direction of the figure). Based on these features, it can meet the functional needs of specific door or window installations, avoiding direct contact between the door/window and the installation body (such as door frames, window frames, etc.), preventing collision interference, and wear; it can also fit or cover gaps in the door/window when closed, preventing dust accumulation and enhancing aesthetics.

Example 3

Figure 7:
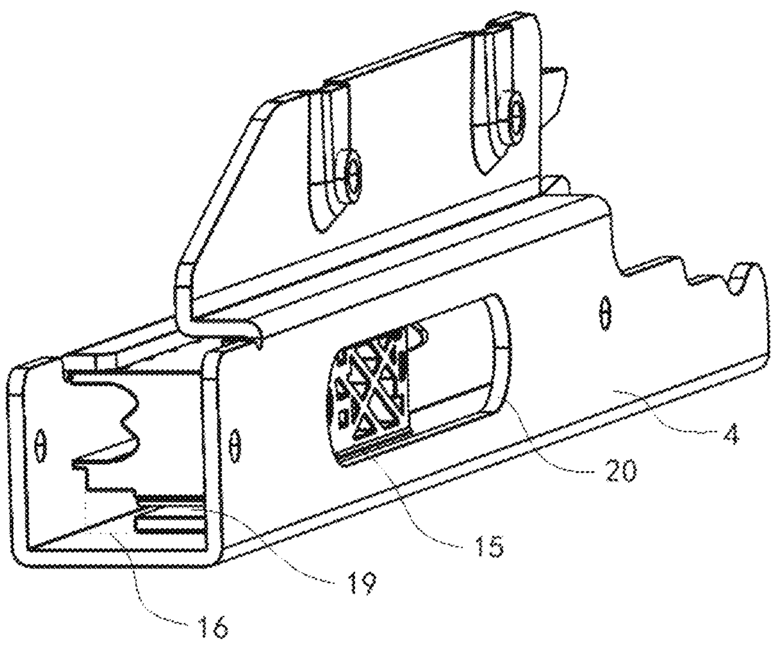
FIG. 7 is a schematic diagram of the cooperation state between the stroke bracket and the sliding base.
Figure 9:
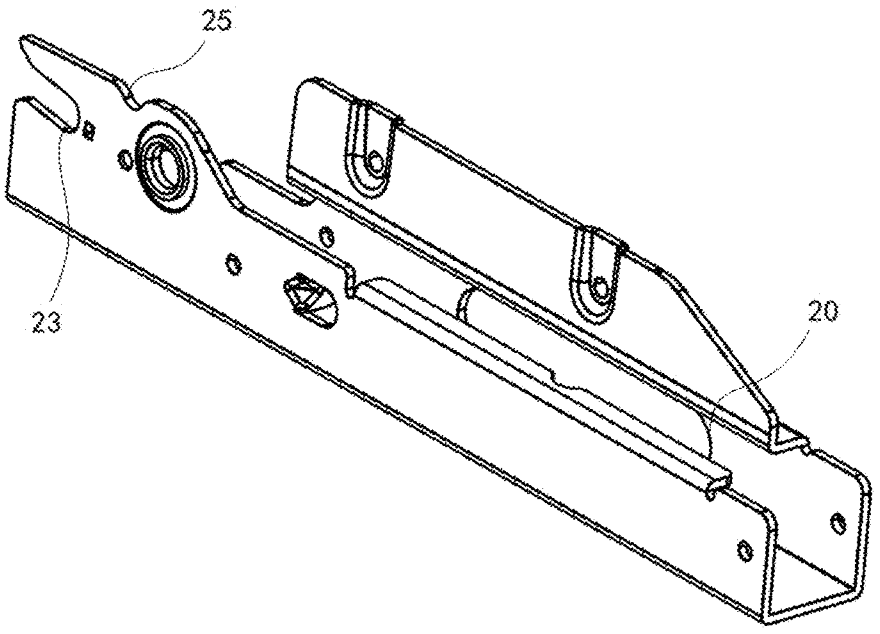
FIG. 9 is a schematic diagram of the stroke bracket (1).
Figure 10:
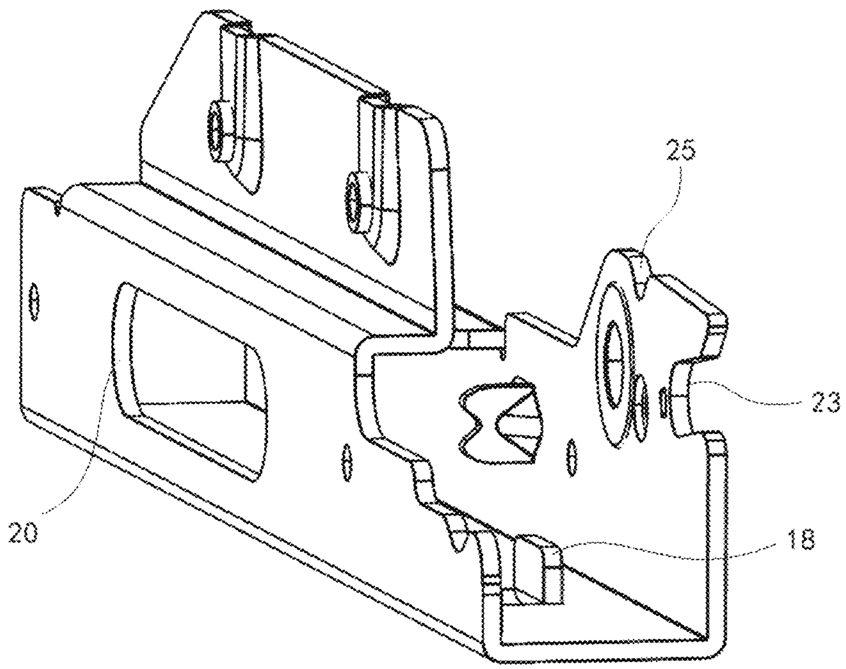
FIG. 10 is a schematic diagram of the stroke bracket (2).
Figure 11:
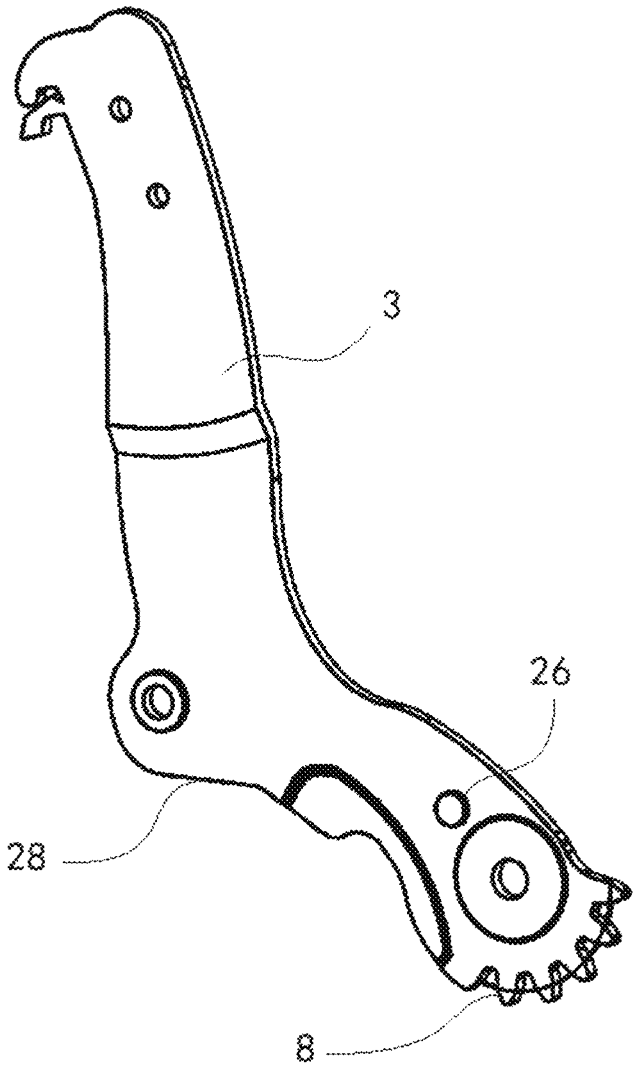
FIG. 11 is a schematic diagram of the transmission arm plate.
Figure 14:
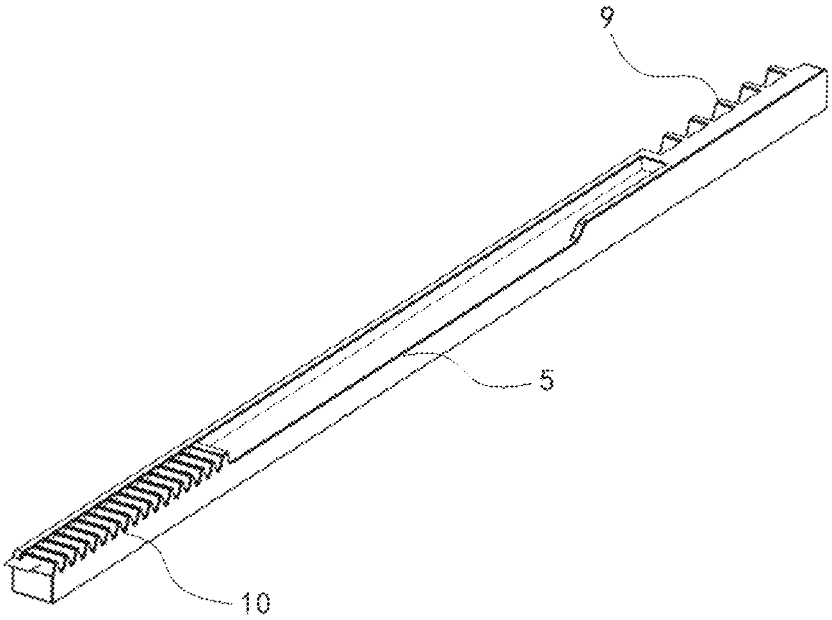
FIG. 14 is a schematic diagram of the linear transmission component.

As shown in FIGS. 7, 9, and 10, in this embodiment of the door and window switching mechanism with a stroke adjustment function, the sliding base 15 is slidably matched with the stroke bracket 4. The lower end of the side farthest from the mounting base 7 is provided with a notch 16 for the sliding of the linear transmission component 5. The notch 16 is gap-fitted with the linear transmission component 5. The bottom of the end of the stroke bracket 4 near the first rack 9 is provided with a vertical plate 18 protruding inward from the stroke bracket 4, which is close to the side of the first rack 9, and cooperates with the notch 16 for sliding limitation of the linear transmission component 5. To limit the first and second racks 9 and 10 at both ends of the linear transmission component 5 from entering the notch 16, the thickness of the linear transmission component 5 is designed to be less than that of the first and second racks 9 and 10 at both ends, i.e., the upper end surface of the linear transmission component 5 is lower than the upper end surfaces of the first and second racks 9 and 10 (as shown in FIG. 14).

Example 4

Figure 8:
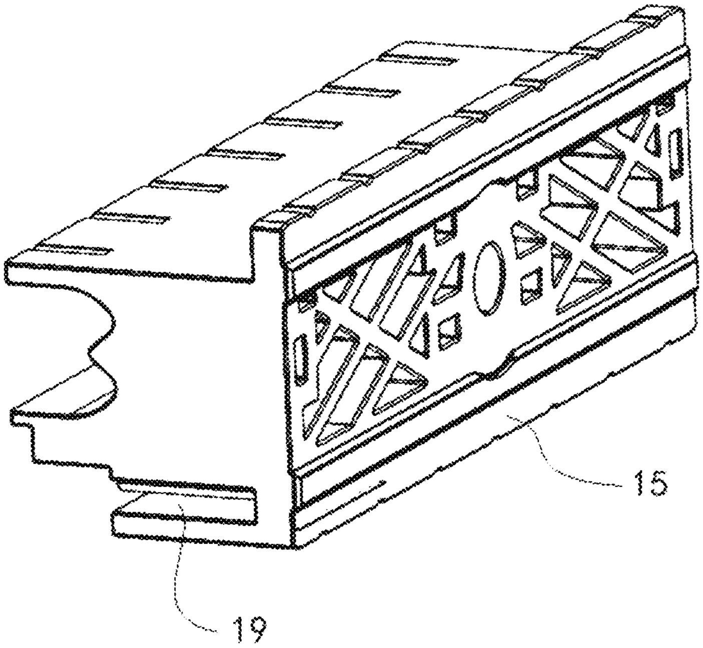
FIG. 8 is a schematic diagram of the sliding base.

As shown in FIGS. 6-8, in this embodiment of the door and window switching mechanism with a stroke adjustment function, one side of the sliding base 15 is provided with a card slot 19, which is connected to the synchronous belt 14 by card engagement, achieving a fixed and detachable connection between the sliding base 15 and the synchronous belt 14, reducing installation difficulty.

In addition, in this embodiment, a long hole 20 is provided on the side of the stroke bracket 4 near the mounting base 7. A connecting rod 21 is fixedly connected to the side of the sliding base 15 and extends out from the long hole 20, used for connecting and realizing the connection between the mounting base 7 and the sliding base 15. Meanwhile, the mounting base 7 is connected with the connecting rod 21 by card engagement, making the door or window detachable, convenient for cleaning and maintenance.

To achieve a lightweight design of the sliding base 15, it adopts a hollow structure arranged in a grid pattern.

Example 5

As shown in FIGS. 9-12, in this embodiment of the door and window switching mechanism with a stroke adjustment function, the mounting panel 1 and the stroke adjustment mechanism 2 are rotationally connected through a shaft frame 22. The stroke bracket 4 is provided with a shaft frame card slot 23 and a detachable shaft frame connecting piece 24. The shaft frame 22 is mounted at the position of the shaft frame card slot 23 through the shaft frame connecting piece 24, achieving a detachable rotational connection between the mounting panel 1 and the stroke adjustment mechanism 2, with the features of easy assembly and maintenance.

Example 6

Figure 12:
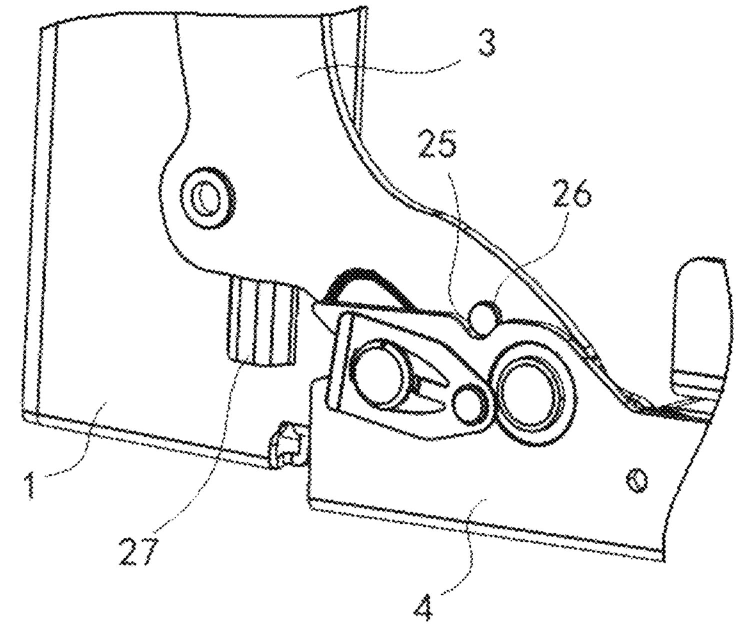
FIG. 12 is a schematic diagram of the limit in the open state of the invention.

As shown in FIG. 12, in this embodiment of the door and window switching mechanism with a stroke adjustment function, the stroke bracket 4 is provided with a limiting slot 25, and the transmission arm plate 3 is L-shaped. A limiting protrusion 26 is provided on the end of the transmission arm plate 3 close to the gear plate 8, which corresponds with the limiting slot 25. The mounting panel 1 is provided with a limiting base 27 protruding from the end surface of the mounting panel 1, and the lower end surface of the L-shaped transmission arm plate 3 corresponds with the limiting base 27. The rotationally connected mounting panel 1 and stroke adjustment mechanism 2 are limited by the corresponding limiting slot and protrusion, limiting base, and limiting surface to control the opening and closing angle of the mounting panel 1 and stroke adjustment mechanism 2.

Example 7

Figure 13:
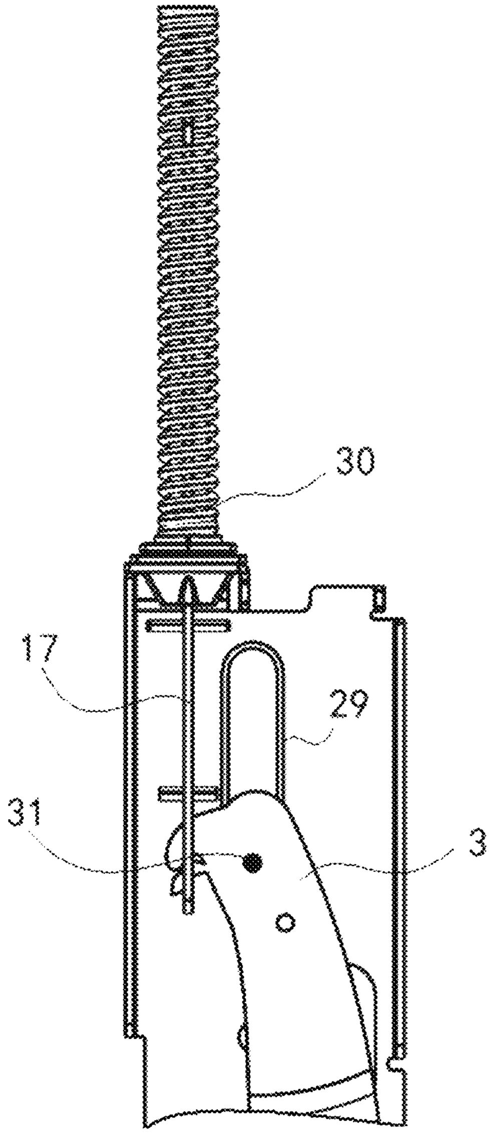
FIG. 13 is a schematic diagram of the spring buffer component.

As shown in FIG. 13, in this embodiment of the door and window switching mechanism with a stroke adjustment function, the mounting panel 1 is provided with a sliding slot 29 and a spring buffer component 30. The sliding slot 29 is used to achieve the sliding of the transmission arm plate 3 and control the sliding stroke of the transmission arm plate 3. Specifically, a sliding block 31 is provided on the sliding slot 29, which is slidably matched and rotationally connected with the transmission arm plate 3. The spring buffer component 30 is used to control the elastic reset of the stroke adjustment mechanism 2 (equivalent to the elastic reset of the door or window). Specifically, one end of the spring buffer component 30 is connected with a pull rod 17, which is card-connected with the transmission arm plate 3.

The above description is only a preferred specific embodiment of the present invention. However, the protection scope of the present invention is not limited thereto. Any changes or replacements easily thought of by those skilled in the art within the technical scope disclosed by the present invention should be covered within the protection scope of the present invention. Therefore, the protection scope of the present invention should be based on the protection scope defined by the claims.

What is claimed is:

1. A door and window switching mechanism with a stroke adjustment function, comprising:

a mounting panel, a stroke adjustment mechanism, and a transmission arm plate disposed between the mounting panel and the stroke adjustment mechanism, wherein the mounting panel and the stroke adjustment mechanism are rotationally connected, and one end of the transmission arm plate is slidably connected to the mounting panel while the other end is rotationally connected to the stroke adjustment mechanism, wherein the stroke adjustment mechanism comprises:

a stroke bracket, a linear transmission component, a stroke adjustment assembly, and a mounting base, wherein the linear transmission component is slidably mounted on the stroke bracket, and the mounting base is mounted on the stroke adjustment assembly, with both ends of the linear transmission component being drivingly engaged with the transmission arm plate and the stroke adjustment assembly;

when the mounting panel and the stroke adjustment mechanism rotate relative to each other, the linear transmission component converts the rotational movement of the transmission arm plate into its own sliding movement and transmits it to the stroke adjustment assembly, and after amplification by the stroke adjustment assembly, it drives the mounting base to displace in an extension direction of the stroke bracket;

wherein a limiting slot is provided on the stroke bracket, the transmission arm plate is L-shaped, and a limiting protrusion is provided on the end of the transmission arm plate close to a gear plate and protrudes from an end surface of the transmission arm plate, the limiting slot and the limiting protrusion being correspondingly engaged to restrict a final position of the transmission arm plate and the stroke bracket in an open state of the door or window, thereby controlling an opening and closing angle of the door or window.

2. The door and window switching mechanism with a stroke adjustment function according to claim 1, characterized in that the gear plate is provided on the end of the transmission arm plate that is rotationally connected to the stroke adjustment mechanism, and a first rack is provided on the end of the linear transmission component that is drivingly engaged with the transmission arm plate, the first rack meshing with the gear plate, and the relative rotation of the transmission arm plate and the linear transmission component driving the linear transmission component to perform reciprocating movement on the stroke bracket.

3. The door and window switching mechanism with a stroke adjustment function according to claim 2, characterized in that a second rack is provided on the end of the linear transmission component that is drivingly engaged with the stroke adjustment assembly, the stroke adjustment assembly comprising a transmission gear, a synchronous pulley, a driven pulley, a synchronous belt, and a sliding base, wherein the synchronous pulley and the driven pulley are respectively arranged on both sides of the stroke bracket and are rotationally mounted via a rotating shaft, and the synchronous belt is wrapped around the synchronous pulley and the driven pulley and meshes with them to achieve synchronous rotation of the synchronous pulley and the driven pulley, the sliding base being fixedly connected to the synchronous belt, and the mounting base being fixedly connected to the sliding base;

wherein the transmission gear is coaxially arranged with the synchronous pulley and rotates synchronously, the transmission gear meshing with the second rack, and when the linear transmission component performs reciprocating movement on the stroke bracket, the synchronous belt moves synchronously, thereby driving the mounting base fixedly connected to the sliding base to perform reciprocating movement on the stroke bracket.

4. The door and window switching mechanism with a stroke adjustment function according to claim 3, characterized in that the sliding base is slidably engaged with the stroke bracket, and a notch is provided at a lower end of a side of the sliding base farthest from the mounting base for the sliding of the linear transmission component, wherein a thickness of the linear transmission component is less than a thickness of the first rack and the second rack at both ends, i.e., the upper end surface of the linear transmission component is lower than the upper end surfaces of the first rack and the second rack at both ends, and the notch is gap-fitted with the linear transmission component, thereby restricting the first rack and the second rack at both ends from entering the notch;

wherein a vertical plate is provided on the end of the stroke bracket near the first rack and protrudes inward from a bottom of the stroke bracket, the vertical plate being close to a side of the first rack.

5. The door and window switching mechanism with a stroke adjustment function according to claim 4, characterized in that a card slot is provided on one side of the sliding base, the card slot being connected to the synchronous belt by card engagement, thereby achieving a fixed connection between the sliding base and the synchronous belt.

6. The door and window switching mechanism with a stroke adjustment function according to claim 4, characterized in that a long hole is provided on a side surface of the stroke bracket near the mounting base, and a connecting rod is fixedly connected to the side of the sliding base, the connecting rod extending out from the long hole, the mounting base being connected to the sliding base via the connecting rod and moving along with the sliding base.

7. The door and window switching mechanism with a stroke adjustment function according to claim 4, characterized in that the mounting panel and the stroke adjustment mechanism are rotationally connected via a shaft frame, wherein a shaft frame card slot is provided on the stroke bracket, and a detachable shaft frame connecting piece is provided, the shaft frame being mounted at a position of the shaft frame card slot via the shaft frame connecting piece.

8. The door and window switching mechanism with a stroke adjustment function according to claim 7, characterized in that a limiting base is provided on the mounting panel protruding from an end surface of the mounting panel, and a lower end surface of the L-shaped transmission arm plate comprises a limiting surface which corresponds with the limiting base;

wherein the rotationally connected mounting panel and stroke adjustment mechanism are limited by the corresponding engagement of the limiting slot and the limiting protrusion, the limiting base, and the limiting surface to control the opening and closing angle of the mounting panel and the stroke adjustment mechanism.

9. The door and window switching mechanism with a stroke adjustment function according to claim 7, characterized in that a sliding slot and a spring buffer component are provided on the mounting panel, wherein the sliding slot is provided with a sliding block that is slidably engaged, the sliding block being rotationally connected to the transmission arm plate, achieving a sliding connection between the transmission arm plate and the mounting panel;

wherein one end of the spring buffer component is connected to a pull rod, the pull rod being card-connected to the transmission arm plate.

10. The door and window switching mechanism with a stroke adjustment function according to claim 7, characterized in that the sliding base has a lightweight hollow structure, with the hollow structure arranged in a grid pattern.

* * * * *